United States Patent [19]

Kulkarni et al.

[11] Patent Number: 4,496,478

[45] Date of Patent: Jan. 29, 1985

[54] PROCESS FOR SEPARATING UNSAPONIFIABLES FROM FATTY AND ROSIN ACIDS

[75] Inventors: Sudhir S. Kulkarni; Santi Kulprathipanja, both of Hoffman Estates, Ill.

[73] Assignee: UOP Inc., Des Plaines, Ill.

[21] Appl. No.: 584,030

[22] Filed: Feb. 27, 1984

[51] Int. Cl.[3] .......... C09F 1/00; C09F 5/10

[52] U.S. Cl. .......... 260/97.6; 260/97.7; 260/428.5

[58] Field of Search .......... 260/97.6, 97.7

[56] References Cited

U.S. PATENT DOCUMENTS

| | | | |
|---|---|---|---|
| 2,315,584 | 4/1943 | Borglin | 260/97.7 |
| 2,316,499 | 4/1943 | Borglin | 260/97.7 |
| 2,360,862 | 10/1944 | Morris et al. | 260/97.7 |
| 2,530,809 | 11/1950 | Christenson et al. | 260/97.7 |
| 3,803,114 | 4/1974 | Mitchell et al. | 260/97.7 |
| 3,965,085 | 6/1976 | Holmborn et al. | 260/97.6 |
| 4,404,145 | 9/1983 | Cleary et al. | 260/97.7 |

*Primary Examiner*—Herbert S. Cockeram

*Attorney, Agent, or Firm*—William H. Page, II; Louis A. Morris

[57] ABSTRACT

A process for separating an unsaponifiable compound from a feed mixture including fatty and/or rosin acids. The process comprises: (a) forming an emulsion with the feed mixture, an organic solvent in which the feed mixture is soluble and an emulsifying liquid capable of forming an emulsion with the feedstock and organic solvent, the polarity index of the emulsifying liquid being at least 2.4 higher than the polarity index of the organic solvent; (b) effecting the formation of three phases from the emulsion, an organic solvent phase containing the major portion of the fatty or rosin acids, an emulsifying liquid phase and a semi-solid sludge phase containing the major portion of the unsaponifiable compound; and (c) separating the three phases.

11 Claims, No Drawings

PROCESS FOR SEPARATING UNSAPONIFIABLES FROM FATTY AND ROSIN ACIDS

BACKGROUND OF THE INVENTION

1. Field of the Invention

The field of art to which this invention pertains is the separation of unsaponifiables from fatty and rosin acids by a process employing liquids to effect the removal of the unsaponifiables.

2. Background Information

There is a wealth of patent art teaching the separation of unsaponifiables from tall oil soap using liquid-liquid extraction schemes. Examples of such schemes are as disclosed in U.S. Pat. Nos. 3,965,085 to Holmborn et al., 3,803,114 to Mitchell et al. and 2,530,809 to Christenson et al. In these schemes unsaponifiables are extracted from aqueous solution with salts of fatty and rosin acids by contacting the solutions with a solvent, such as a hydrocarbon, in which the unsaponifiables are soluble and thereby removing the unsaponifiables from the salts. The fatty and rosin acid salts, according to these references, may then be converted to the acid forms to obtain tall oil.

With further regard to the above mentioned Mitchell et al. patent, it is taught (column 4) that emulsions formed when the attempt is made to extract unsaponifiables from aqueous solutions with a hydrocarbon solvent cause a serious problem which prevents successful completion of the extraction. This "problem" was solved by the use of certain alcohols which acted as de-emulsifiers. The teaching goes on to state that if water, soap skimmings, alcohol and hydrocarbon were shaken up together, the unsaponifiables would be extracted by the hydrocarbon and, when the mixture was allowed to stand, the components would quickly separate into a lower phase, consisting mainly of soap-water-alcohol, and an upper phase consisting mainly of hydrocarbon and unsaponifiables.

The present invention, in marked contradistinction to the known processes, effects the separation of unsaponifiables from fatty and rosin acids (not salts) and requires, as an essential step of the process, the formation of an emulsion.

SUMMARY OF THE INVENTION

The primary objective of the present invention is to provide a process for the separation of unsaponifiable compounds from admixture with fatty and/or rosin acids.

In its broadest embodiment, the present invention comprises a process for separating an unsaponifiable compound from a feed mixture comprising a fatty acid or rosin acid. The process comprises: (a) forming an emulsion with the feed mixture, an organic solvent in which the feed mixture is soluble and an emulsifying liquid capable of forming an emulsion with the feedstocks and the organic solvent, the polarity index of the emulsifying liquid being at least 2.4 higher than the polarity index of the organic solvent; (b) effecting the formation of three phases from the emulsion, an organic solvent phase containing the major portion of the fatty acid or rosin acid, an emulsifying liquid phase and a semi-solid sludge phase containing the major portion of the unsaponifiable compound; and (c) separating the three phases.

Other embodiments of the present invention encompass various details such as to specific compositions and proportions of feedstock, solvent and emulsifying liquid, all of which are hereinafter disclosed in the following discussion of each of the facets of the present invention.

DESCRIPTION OF THE INVENTION

Before considering feed mixtures which can be charged to the process of this invention, brief reference is first made to the terminology and to the general production of fatty acids. The fatty acids are a large group of aliphatic monocarboxylic acids, many of which occur as glycerides (esters of glycerol) in natural fats and oils. Although the term "fatty acids" has been restricted by some to the saturated acids of the acetic acid series, both normal and branched chain, it is now generally used, and is so used herein, to include also related unsaturated acids, certain substituted acids, and even aliphatic acids containing alicyclic substituents. The naturally occurring fatty acids with a few exceptions are higher straight chain unsubstituted acids containing an even number of carbon atoms. The unsaturated fatty acids can be divided, on the basis of the number of double bonds in the hydrocarbon chain, into monoethanoid, diethanoid, triethanoid, etc. (or monoethylenic, etc.). Thus the term "unsaturated fatty acid" is a generic term for a fatty acid having at least one double bond, and the term "polyethanoid fatty acid" means a fatty acid having more than one double bond per molecule. Fatty acids are typically prepared from glyceride fats or oils by one of several "splitting" or hydrolytic processes. In all cases, the hydrolysis reaction may be summarized as the reaction of a fat or oil with water to yield fatty acids plus glycerol. In modern fatty acid plants this process is carried out by continuous high pressure, high temperature hydrolysis of the fat. Starting materials commonly used for the production of fatty acids include coconut oil, palm oil, inedible animal fats, and the commonly used vegetable oils, soybean oil, cottonseed oil and corn oil.

The source of feedstocks with which the present invention is primarily concerned is tall oil, a by-product of the wood pulp industry, usually recovered from pine wood "black liquor" of the sulfate or Kraft paper process. Tall oil contains about 50–60% fatty acids and about 34–40% rosin acids. The fatty acids include oleic, linoleic, palmitic and stearic acids. Rosin acids, such as abietic acid, are monocarboxylic acids having a molecular structure comprising carbon, hydrogen and oxygen with three fused six-membered carbon rings.

It is normal for tall oil to also contain a high neutrals or unsaponifiables content (the terms "neutrals" or "unsaponifiables" as used herein are intended to be interchangeable). The neutrals commonly found in tall oil have been quantitatively analyzed and more than 80 compounds found (Conner, A. H. and Rowe, J. W., JAOCS, 52, 334-8 (1975)). All of the compounds that comprised 1% or more of the neutrals are identified below:

| Compound | % | Structure (Backbone) |
| --- | --- | --- |
| Diterpene Hydrocarbons | 2.5 | $C_{20}H_{40}O$; Acyclic, Monocyclic, Bicyclic, and mostly Tricyclic |

-continued

| Compound | % | Structure (Backbone) |
| --- | --- | --- |
| Resin Alcohols | 8.1 | 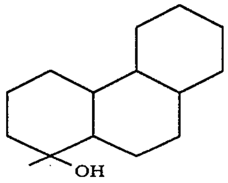 |
| Resin Aldehydes | 10.0 | 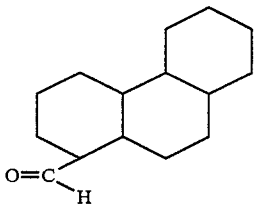 |
| Bicyclic Diterpene Alcohols | 16.8 | 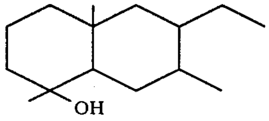 |
| Steroids | 32.4 | 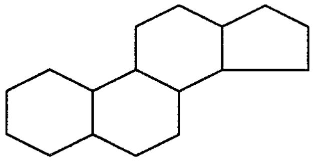 |
| Wax Alcohols | 6.1 | (long carbon chain) - OH |
| Stilbenes | 5.7 | 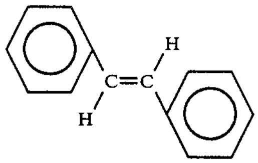 |
| Lubricating Oil | 4.4 | (long carbon chain) |

The first step in the process of the present invention is to form an emulsion with the feedstock, an organic solvent in which the feedstock is soluble and an appropriate emulsifying liquid. The polarity index of the emulsifying liquid must be at least 2.4 higher than the polarity index of the organic solvent. Examples of suitable solvents and their respective polarity indexes are as follows:

| Solvent | Polarity Index |
| --- | --- |
| iso-octane | −0.4 |
| n-hexane | 0.0 |
| ethanol | 5.2 |
| methanol | 6.6 |
| acetone | 5.4 |

A suitable emulsifying liquid for use with all of the above solvents is water which has a polarity index of 9. The facility with which an emulsion is formed increases in part, with increasing concentration of neutrals in the feedstock. To achieve the best separation, the solvent with the highest polarity that will allow emulsion formation with the particular emulsifying liquid and feedstock, should be used. The emulsion preferably comprises from about 20 wt. % to about 30 wt. feed mixture, from about 20 wt. % to about 30 wt. % organic solvent and from about 40 wt. % to about 60 wt. % emulsifying liquid. The emulsion is best formed by extreme agitation of a mixture of the feed mixture, solvent and emulsifying liquid, which is conveniently accomplished on a laboratory scale with a household food blender.

The second step of the process of the present invention is to effect the formation of three phases from the emulsion. An organic solvent phase will contain the major portion of the feedstock acids. The emulsifying liquid will form a separate liquid phase. It is, however, the formation and content of a third stage comprising a semi-solid sludge that is surprising.

The above semi-solid sludge contains the major portion of the unsaponifiable compound. This is particularly surprising in view of the teachings of many of the above references that the unsaponifiables are extracted from aqueous solution by a solvent, i.e., the prior art teaches that the unsaponifiables will move from the aqueous phase to the solvent phase. The relative selectivity ($\alpha$) of the sludge for the unsaponifiables as compared to the solvent for the unsaponifiables is defined by the expression:

$$\alpha = \frac{\left( \dfrac{\text{unsaponifiables}}{\text{acids}} \right) \text{sludge}}{\left( \dfrac{\text{unsaponifiables}}{\text{acids}} \right) \text{solvent}}$$

This relative selectivity in the process of the present invention tends to be considerably greater than 1 and as high as 5 or even more which provides a quantitative indication of the effectiveness of the present invention. A minor portion of the unsaponifiables, which tends to be the lightest portion, will be contained in the solvent phase and, if desired, could be removed by further treatment with conventional solvent extraction processes.

The formation of the three phases would occur eventually if the emulsion were simply allowed to stand by virtue of force of gravity. That method, however, would of course be impractical because of the excessive time required. It is therefore preferred that such formation be effected by the application of centrifugal force to the emulsion. In the laboratory such force may be applied by aeans of a simple centrifuge. On a commercial scale there are centrifugal separation devices available that could process any required volume.

The final step in the process of the present invention is to separate the three phases. This is accomplished by the separate withdrawal of the two liquid phases, so as to effect the separation, such as by decanting each liquid phase sequentially. The sludge may then be removed from the container or apparatus by mechanical or chemical means. The minor portions of bound solvent, fatty acid or rosin acid and the major portions of unsaponifiable compounds in the sludge may be recovered by evaporating off from about 7 to 12% by weight of the bound solvent which effect separation of the acids and unsaponifiable compounds from the sludge as an upper liquid phase, and then decanting the acids and unsaponifiable compounds.

The following examples are presented for illustrative purposes only and are not intended to limit the scope of the present invention.

EXAMPLE I

In a first experiment, 30.4 g. of Reichhold crude tall oil (57 wt. % fatty acids, 30 wt. % rosin acids and 13 wt. % neutrals), 30.2 g. of iso-octane and 55 g. of water were blended and emulsified in a Waring blender. The emulsion was then centrifuged at 9,000 rpm. Three phases were then observed, two liquids and a solid sludge. The liquid phases were separately decanted and analyzed.

The first liquid decanted weighed 35 g. and contained 19 g. of tall oil components. The second liquid phase consisted essentially of 20 g. of water. The solid sludge phase weighed 66 g. and was found to contain 9 g. of tall oil components. The tall oil and unsaponifiable compounds in the sludge were easily separated from the sludge after evaporation of from about 4 to 8 g. of solvent, which was estimated to be about 7 to 12% by weight of the bound solvent followed by the decanting of the upper phase formed which comprised the acids and unsaponifiable compounds. The relative selectivity of the sludge for the unsaponifiables (as compared to the solvent for the unsaponifiables) was found to be 5.0.

EXAMPLE II

For this example the effect of different solvents in the process of the present invention was studied. A model feedstock was prepared comprising a depitched crude tall oil (30% rosin acids, 70% fatty acids and less than 1% unsaponifiables) to which was added the unsaponifiable alcohols sitosterol and 1-octadecanol. A series of emulsions were made having the following compositions:

1 part by wt.
- 20 wt. % sitosterol
- 20 wt. % 1-octadecanol
- 60 wt. % depitched crude tall oil 0.9–1.1 part by wt. organic solvent
1.8–2 part by wt. $H_2O$ The selectivities with four different solvents along with the amount of tall oil recovered in the sludge and solvent phases when the emulsions were centrifuged and the liquid phases decanted were as follows:

| | Selectivity | | Tall Oil (g.) | |
|---|---|---|---|---|
| Solvent | sitosterol Acids | 1-octadecanol Acids | Sludge | Solvent |
| iso-octane | 3.8 | 1.12 | 6.4 | 3.5 |
| hexane | 3.0 | 1.04 | 4.1 | 7.5 |
| acetone | 1.8 | 1.9 | 7.6 | 4.1 |
| ethanol | 6.5 | 1.7 | 6.9 | 4.0 |

From the above data it appears that ethanol is probably the most desirable of the solvents for this model system. Considering the unsaponifiables as a whole, the highest selectivities are consistently achieved with ethanol.

We claim as our invention:

1. A process for separating an unsaponifiable compound from a feed mixture comprising a fatty acid and a rosin acid, said process comprising:
   (a) forming an emulsion with said feed mixture, an organic solvent in which said feed mixture is soluble and an emulsifying liquid capable of forming an emulsion with said feed mixture and said organic solvent, the polarity index of said emulsifying liquid being at least 2.4 higher than the polarity index of said organic solvent;
   (b) effecting the formation of three phases from said emulsion, an organic solvent phase containing the major portion of said fatty acid and rosin acid, an emulsifying liquid phase and a semi-solid sludge phase containing the major portion of said unsaponifiable compound; and
   (c) separating the three phases.

2. The process of claim 1 wherein said emulsion comprises from about 20 wt. % to about 30 wt. % feed mixture, from about 20 wt. % to about 30 wt. % organic solvent and from about 40 wt. % to about 60 wt. % emulsifying liquid.

3. The process of claim 1 wherein said organic solvent comprises iso-octane, n-hexane, acetone, ethanol or methanol.

4. The process of claim 1 wherein said emulsifying liquid comprises water.

5. The process of claim 1 wherein said emulsion is formed in step (a) by extreme agitation of a mixture of said feed mixture, said organic solvent, and said emulsifying liquid.

6. The process of claim 1 wherein said formation of three phases in step (b) is effected by the application of centrifugal force to said emulsion.

7. The process of claim 1 wherein said separation of the three phases in step (c) is effected by separately withdrawing the two liquid phases.

8. The process of claim 7 wherein each said liquid phase is decanted.

9. The process of claim 1 wherein said feed mixture comprises crude tall oil.

10. The process of claim 1 wherein said sludge phase contains minor portions of bound solvent, water, fatty acid and rosin acid and a major portion of said unsaponifiable compounds, said acids and unsaponifiable compounds being recovered from said sludge phase by evaporating off from about 7 to 12% by weight of said bound solvent, which effects separation of said acids and unsaponifiable compounds from said sludge as an upper phase, and then decanting said acids and unsaponifiable compounds.

11. A process for separating an unsaponifiable compound from a feed mixture comprising a rosin acid, said process comprising:
   (a) forming an emulsion with said feed mixture, an organic solvent in which said feed mixture is soluble and an emulsifying liquid capable of forming an emulsion with said feed mixture and said organic solvent, the polarity index of said emulsifying liquid being at least 2.4 higher than the polarity index of said organic solvent;
   (b) effecting the formation of three phases from said emulsion, an organic solvent containing the major portion of said rosin acid, an emulsifying liquid phase and a semi-solid sludge phase containing the major portion of said unsaponifiable compound; and
   (c) separating the three phases.

* * * * *